(12) United States Patent
He (10) Patent No.: US 8,594,916 B2
(45) Date of Patent: Nov. 26, 2013

(54) PERSPECTIVE-VIEW VISUAL RUNWAY AWARENESS AND ADVISORY DISPLAY

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 197 days.

(21) Appl. No.: 12/894,485

(22) Filed: Sep. 30, 2010

(65) Prior Publication Data

US 2011/0022291 A1 Jan. 27, 2011

Related U.S. Application Data

(62) Division of application No. 11/250,125, filed on Oct. 13, 2005, now Pat. No. 7,908,078.

(51) Int. Cl.
*G06F 19/00* (2011.01)

(52) U.S. Cl.
USPC .............................. 701/120; 701/3; 340/972

(58) Field of Classification Search
USPC .................... 701/3, 120; 340/995.17
See application file for complete search history.

(56) References Cited

U.S. PATENT DOCUMENTS

| | | | |
|---|---|---|---|
| 3,875,551 A * | 4/1975 | Young ............................... | 342/7 |
| 3,896,432 A * | 7/1975 | Young ............................. | 342/33 |
| 4,090,189 A * | 5/1978 | Fisler ........................ | 315/169.1 |
| 4,241,294 A | 12/1980 | Fisler | |
| 4,358,713 A | 11/1982 | Senoo et al. | |
| 4,368,517 A * | 1/1983 | Lovering ......................... | 701/16 |
| 4,419,079 A * | 12/1983 | Georges et al. ................. | 434/43 |
| 4,514,727 A | 4/1985 | Van Antwerp | |
| 4,868,652 A | 9/1989 | Nutton | |
| 5,201,032 A | 4/1993 | Kurose | |
| 5,202,668 A | 4/1993 | Nagami | |
| 5,343,395 A | 8/1994 | Watts | |
| 5,420,582 A * | 5/1995 | Kubbat et al. ................. | 340/974 |
| 5,426,727 A | 6/1995 | Sugiura et al. | |
| 5,654,890 A * | 8/1997 | Nicosia et al. .................. | 701/16 |
| 5,745,095 A | 4/1998 | Parchem et al. | |
| 5,745,863 A | 4/1998 | Uhlenhop et al. | |
| 5,747,863 A | 5/1998 | Shoda | |
| 5,757,127 A | 5/1998 | Inoguchi et al. | |
| 5,892,462 A * | 4/1999 | Tran .............................. | 340/961 |
| 6,057,856 A | 5/2000 | Miyashita et al. | |
| 6,112,141 A * | 8/2000 | Briffe et al. ..................... | 701/14 |
| 6,166,744 A | 12/2000 | Jaszlics et al. | |
| 6,208,933 B1 | 3/2001 | Lazar | |
| 6,314,363 B1 * | 11/2001 | Pilley et al. ................... | 701/120 |
| 6,317,059 B1 * | 11/2001 | Purpus et al. ................. | 340/974 |
| 6,327,089 B1 | 12/2001 | Hosaki et al. | |
| 6,359,737 B1 | 3/2002 | Stringfellow | |
| 6,486,856 B1 | 11/2002 | Zink | |
| 6,496,760 B1 | 12/2002 | Michaelson et al. | |

(Continued)

*Primary Examiner* — Helal A Algahaim (74) *Attorney, Agent, or Firm* — Ingrassia, Fisher & Lorenz, P.C.

(57) ABSTRACT

A graphical display system includes one or more sensors for obtaining data, wherein the data obtained includes position and trajectory data for a craft and airport data; a display element for displaying graphics and data; and at least one processor coupled to the one or more sensors. Based on data received from the one or more sensors regarding craft position and trajectory relative to an airport, the at least one processor determines if a runway is being targeted, selects which runway guides and alerts to display based on data obtained and runway targeted, and sends signals to the display element to display the targeted runway with the selected runway guides and alerts.

18 Claims, 6 Drawing Sheets

(56) References Cited

U.S. PATENT DOCUMENTS

| | | |
|---|---|---|
| 6,504,518 B1 | 1/2003 | Kuwayama et al. |
| 6,545,677 B2 | 4/2003 | Brown |
| 6,545,803 B1 | 4/2003 | Sakuma et al. |
| 6,570,559 B1 | 5/2003 | Oshima |
| 6,570,581 B1 | 5/2003 | Smith |
| 6,571,166 B1 * | 5/2003 | Johnson et al. ............... 701/120 |
| 6,591,171 B1 * | 7/2003 | Ammar et al. .................. 701/16 |
| 6,606,563 B2 * | 8/2003 | Corcoran, III ................ 701/301 |
| 6,618,045 B1 | 9/2003 | Lin |
| 6,636,277 B2 | 10/2003 | Eberhardt et al. |
| 6,650,340 B1 | 11/2003 | Georges et al. |
| 6,678,588 B2 | 1/2004 | He |
| 6,690,296 B2 | 2/2004 | Corwin et al. |
| 6,690,299 B1 * | 2/2004 | Suiter ............................ 340/973 |
| 6,690,351 B1 | 2/2004 | Wong |
| 6,696,980 B1 * | 2/2004 | Langner et al. ............... 340/971 |
| 6,700,482 B2 * | 3/2004 | Ververs et al. ................ 340/500 |
| 6,703,945 B2 | 3/2004 | Kuntman et al. |
| 6,711,479 B1 * | 3/2004 | Staggs ............................ 701/16 |
| 6,720,891 B2 * | 4/2004 | Chen et al. .................... 340/969 |
| 6,727,489 B2 | 4/2004 | Yano |
| 6,744,478 B1 | 6/2004 | Asakura et al. |
| 6,747,650 B2 | 6/2004 | Turner et al. |
| 6,762,801 B2 | 7/2004 | Weiss et al. |
| 6,950,037 B1 * | 9/2005 | Clavier et al. ................ 340/945 |
| 6,957,130 B1 * | 10/2005 | Horvath et al. ................... 701/3 |
| 6,978,205 B2 * | 12/2005 | Ryan et al. .................... 701/120 |
| 6,985,091 B2 * | 1/2006 | Price .............................. 340/975 |
| 7,085,630 B2 * | 8/2006 | Ryan et al. ...................... 701/16 |
| 7,283,064 B2 * | 10/2007 | He ................................. 340/973 |
| 7,295,901 B1 * | 11/2007 | Little et al. ...................... 701/16 |
| 7,477,985 B2 * | 1/2009 | Shirley et al. ................. 701/120 |
| 2002/0099528 A1 * | 7/2002 | Hett ................................ 703/13 |
| 2002/0167536 A1 | 11/2002 | Valdes et al. |
| 2002/0171639 A1 | 11/2002 | Ben-David |
| 2003/0016236 A1 | 1/2003 | Bronson |
| 2003/0083804 A1 * | 5/2003 | Pilley et al. ................... 701/120 |
| 2003/0122810 A1 | 7/2003 | Tsirkel et al. |
| 2003/0132860 A1 * | 7/2003 | Feyereisen et al. ............ 340/973 |
| 2004/0006412 A1 * | 1/2004 | Doose et al. .................... 701/10 |
| 2004/0044446 A1 * | 3/2004 | Staggs ............................. 701/16 |
| 2004/0046712 A1 * | 3/2004 | Naimer et al. ..................... 345/9 |
| 2004/0167685 A1 * | 8/2004 | Ryan et al. ...................... 701/16 |
| 2004/0189492 A1 * | 9/2004 | Selk et al. ...................... 340/973 |
| 2004/0201596 A1 | 10/2004 | Coldefy et al. |
| 2005/0007261 A1 | 1/2005 | Berson et al. |
| 2005/0007386 A1 | 1/2005 | Berson et al. |
| 2005/0024237 A1 * | 2/2005 | Gannett .......................... 340/967 |
| 2005/0182531 A1 * | 8/2005 | Ryan et al. ...................... 701/16 |
| 2005/0190079 A1 * | 9/2005 | He ................................. 340/945 |
| 2005/0192739 A1 * | 9/2005 | Conner et al. ................. 701/120 |
| 2005/0261813 A1 * | 11/2005 | Ryan et al. ...................... 701/16 |
| 2005/0261814 A1 * | 11/2005 | Ryan et al. ...................... 701/16 |
| 2007/0001874 A1 * | 1/2007 | Feyereisen et al. ......... 340/995.1 |
| 2007/0088491 A1 * | 4/2007 | He ................................. 701/120 |
| 2007/0106433 A1 * | 5/2007 | He ................................... 701/16 |

* cited by examiner

PERSPECTIVE-VIEW VISUAL RUNWAY AWARENESS AND ADVISORY DISPLAY

PRIORITY CLAIM

This is a divisional of U.S. application Ser. No. 11/250,125, filed Oct. 13, 2005, the disclosure of which is hereby incorporated by reference.

TECHNICAL FIELD

The present invention generally relates to graphical display systems and, in particular, to visual awareness and advisory displays.

BACKGROUND

A runway intrusion is defined as "any occurrence at an airport involving an aircraft, vehicle, person, or object on the ground that creates a collision hazard or results in a loss of separation with an aircraft taking off, intending to take off, landing, or intending to land." FAA ORDER 7210.58. These occurrences can cause serious harm, including death. Naturally, runway intrusions are a major safety issue for aviation. As can be expected, these intrusions are more likely to occur when flight crews are unfamiliar with the airport environment. Due to this unfamiliarity, flight crews may lose overall awareness of their current position and cause a runway intrusion.

Ideally, all flight crews will be trained to be familiar with all airports. However, considering the vast number of airports, this is not a realistic solution. With the many changes in the airline industry and flight routes, even highly experienced flight crews can find themselves at an unfamiliar airport. Additionally, even if the flight crew is familiar with a particular airport, they may still lose overall awareness of their current position due to low visibility conditions.

For the reasons stated above, and for other reasons stated below which will become apparent to those skilled in the art upon reading and understanding the present specification, there is a need in the art for a graphical display system which will aid flight crews in maintaining overall awareness of their current position at unfamiliar airports and in low visibility conditions.

BRIEF SUMMARY

Embodiments of the present invention solve the problem of providing a graphical display system which will aid flight crews in maintaining overall awareness of their current position at unfamiliar airports and in low visibility conditions.

In one embodiment, a method of providing a visual runway awareness and advisor display is provided. The method comprises obtaining current craft position and trajectory, determining if a runway is being targeted, and displaying runway alerts and guides on a graphical display with the runway based on the runway being targeted, current craft position and current craft trajectory.

In another embodiment, a graphical display system is provided. The graphical display system comprises one or more sensors for obtaining data, wherein the data obtained includes position and trajectory data for a craft and airport data, and a display element for displaying graphics and data. The graphical display system also comprises at least one processor coupled to the one or more sensors, wherein, based on data received from the one or more sensors regarding craft position and trajectory relative to an airport, the at least one processor determines if a runway is being targeted and selects which runway guides and alerts to display based on data obtained and runway selected. The at least one processor also sends signals to the display element to display the targeted runway with the selected runway guides and alerts.

In another embodiment, a computer readable medium having computer-executable instructions for performing a method of providing a visual runway awareness and advisory display is provided. The method comprises receiving craft position and trajectory data, receiving runway status data, and determining when a runway is being targeted. The method also comprises selecting runway guides and alerts to display with a targeted runway based on runway status of the targeted runway, craft position, and craft trajectory. The method also comprises displaying runway guides and alerts on a graphical display with the targeted runway.

In yet another embodiment, a graphical display system is provided. The graphical display system comprises means for obtaining data, wherein data includes airport data, and craft position and trajectory data. The graphical display system also comprises means for determining if a runway is being targeted, and means for displaying runway guides and alerts based on the data obtained and a runway being targeted.

BRIEF DESCRIPTION OF THE DRAWINGS

The present invention will hereinafter be described in conjunction with the following drawing figures, wherein like numerals denote like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. Furthermore, it will be understood by one of skill in the art that although the specific embodiments illustrated below are directed at aircraft for purposes of explanation, the method and apparatus may be used in various embodiments employing various types of crafts, such as space shuttles, helicopters, and unmanned air vehicles (UAV), etc. Moreover, embodiments of the present invention are suitable for use on CRT, LCD, plasma displays or any other existing or later developed display technology.

It should also be understood that the exemplary method illustrated may include additional or fewer steps or may be performed in the context of a larger processing scheme. Furthermore, the methods presented in the drawing figures and specification are not to be construed as limiting the order in which the individual steps may be performed. Instructions for carrying out the various methods, process tasks, calculations, control functions, and the generation of display signals and other data used in the operation of the display system are implemented in software programs, firmware or computer readable instructions. These instructions are typically stored on any appropriate medium used for storage of computer readable instructions such as floppy disks, conventional hard disks, CD-ROM, flash memory ROM, nonvolatile ROM, RAM, and other like medium. The following detailed description is, therefore, not to be taken in a limiting sense.

Embodiments of the present invention not only enable flight crews to maintain overall awareness during low visibility conditions but also enable flight crews who are unfamiliar with an airport to maintain overall awareness of their current position. Embodiments of the present invention accomplish this through an intuitive and easy to understand visual display. For example, embodiments of the present invention facilitate identifying targeted runways on final approach and visually indicate if a targeted runway is in a flight plan and if the craft has clearance to use a targeted runway. Additionally, embodiments of the present invention inform flight crews of runway distance remaining and display guides and warnings to aid flight crews in maintaining overall position awareness. Guides and warnings are gradually faded into a display to reduce distraction to the flight crews. Hence, flight crews will better be able to avoid dangerous runway intrusions while taxiing, landing, and taking off through embodiments of the present invention.

Figure 1:
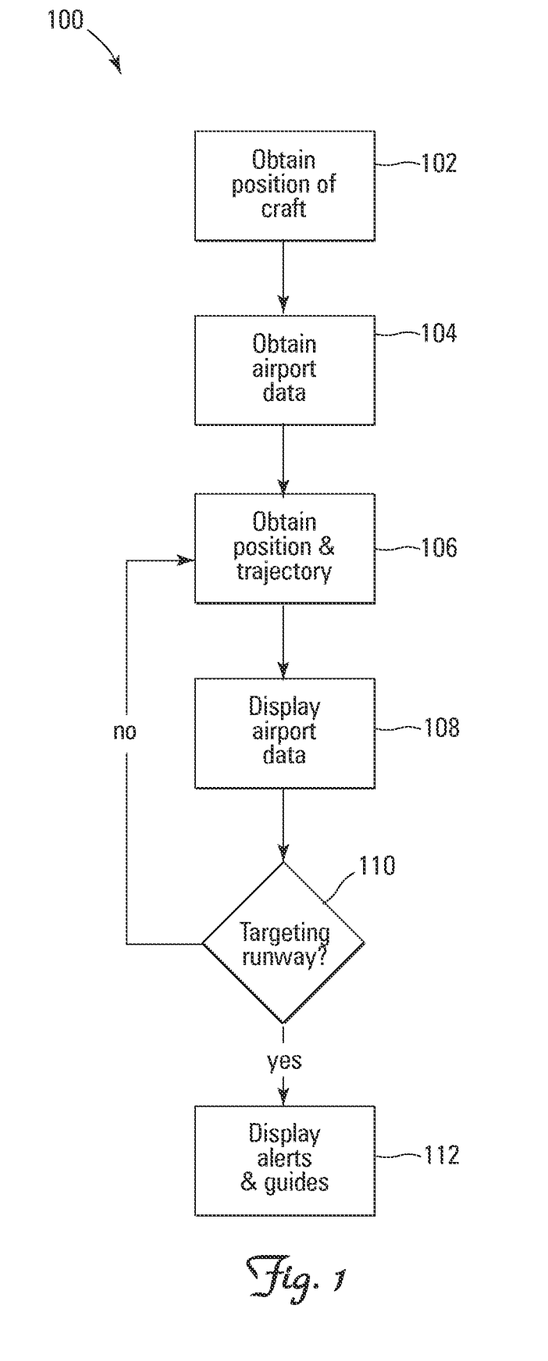
FIG. 1 is a flow chart showing a method for providing a visual runway awareness and advisory display according to one embodiment of the present invention.

FIG. 1 is a flow chart showing a method for providing a visual runway awareness and advisory display according to one embodiment of the present invention. At 102, the current position of a craft is obtained. Various means are used to obtain current craft position. In some embodiments, global positioning satellite (GPS) receivers are used. In other embodiments, VHF omnidirectional range (VOR) signals are used. In other embodiments, other means known to one of skill in the art are used to obtain current craft position. At 104, airport data is obtained. Airport data includes data regarding the position, size, and location of runways at an airport. Airport data is retrieved from a database of airports based on the craft's current position obtained at 102. In some embodiments, an airport database is located on-board the craft. In other embodiments, an airport database is located in a remote site, such as a control tower, and data is transmitted to the crat via telecommunication technology known to one of skill in the art. Airport databases are described in more detail below with regards to FIG. 2.

At 106, the current position and trajectory of the craft are obtained. Trajectory includes data regarding the craft's heading, track and intended flight path according to a flight plan. At 108, a conformal perspective-view of the airport and runways is graphically generated and displayed on a display based on the airport data from an airport database and the current position and trajectory of the craft. In some embodiments, the graphically generated conformal view contains actual photographs. In other embodiments, the graphically generated view is comprised only of computer rendered images. In some embodiments, the conformal perspective-view of the airport and runways is integrated into a primary flight display (PFD).

At 110, it is determined if the craft is targeting a runway. Targeting a runway includes, but is not limited to, approaching a runway for the purpose of landing, approaching a runway for the purpose of taking off, and approaching a runway while taxiing on the ground. In some embodiments it is determined that a craft is targeting a runway when flight path markers are pointing at a runway for an extended period of time. Flight path markers are shown and described in more detail in regards to FIG. 3 below. In other embodiments, it is determined that a craft is targeting a runway when a flight plan indicates a particular runway is to be used. In yet other embodiments, it is determined that a craft is targeting a runway when the trajectory of the craft is pointing toward the runway and the craft is in close proximity to the runway. In still other embodiments, it is determined that a craft is targeting a runway when the craft's trajectory is substantially aligned with the runway bearing and the craft is in close proximity to the runway.

If a craft is not targeting a runway, the process returns to 106 where updated position and trajectory data is obtained. If a craft is targeting a runway, appropriate runway guides and alerts are displayed at 112. Runway guides include, but are not limited to, touch down point markers, threshold markers, distance remaining markers, and runway identifiers. Touch down point markers and threshold markers are shown and described in more detail in regards to FIG. 4 below. Runway alerts are visual messages indicating position of the craft relative to a targeted runway and runway status warnings. Runway status warnings are visual messages including, but not limited to, active status warnings of a targeted runway, and insufficient distance remaining on a targeted runway.

Runway guides and alerts to be displayed are selected based on the position and trajectory of the craft in relation to a runway and the status of the runway. In some embodiments, runway guides change colors and are accompanied by runway status warning messages when necessary to warn flight crews of potential dangerous conditions. In some embodiments, when the aircraft is approaching from the air and taking off from a selected runway, a distance remaining marker is shown to indicate the available runway length ahead. In some such embodiments, the distance remaining marker is shown on both sides of the runway. In some embodiments, the distance remaining markers are displayed in a perspective visual format which flight crews a sense of motion and velocity, as well as informs a flight crew of the distance remaining. If insufficient distance remains on the runway, the distance remaining marker changes color in some embodiments. Additionally, in some embodiments, runway status warnings fade onto the display to warn flight crews that insufficient distance remains on the runway.

Additionally, in some embodiments, when an aircraft nears or crosses a runway, runway identifiers are displayed indicating the runway identification number of both the runway being crossed and the runway on which the aircraft is traveling, if any. In some such embodiments, runway identifiers are displayed on the runway as if painted on the pavement of the runway. In other such embodiments, runway identifiers are displayed near the runway. In some embodiments, such as when an aircraft is targeting a runway on final approach, runway identifiers with just runway identification numbers are displayed on the runway in a conformal perspective-view format. In some such embodiments, the runway identifiers are not displayed on the runway until the aircraft reaches a threshold point. In one embodiment, the threshold point is a set altitude. In another embodiment the threshold is a set distance from the runway.

In some embodiments, a runway identifier is only displayed for a targeted runway. In other embodiments, runway identifiers are displayed on all visible runways as if painted on the pavement when a craft is in close proximity to an airport. In some embodiments, runway identifiers include both runway identification numbers and positional information indicating that the craft is approaching, on, or departing a targeted runway. In some embodiments, runway identifiers are displayed at a visible position on the display near flight symbology. In some such embodiments, the position of the runway identifiers is changed to reduce distraction to a flight crew based on preferences of the flight crew. In other embodiments, a runway identifier with just a runway identification number is displayed on a runway, as if painted on the pavement, in a conformal perspective view. In some embodiments, a runway identifier transitions gradually from a visible position near flight symbology to a position displayed on the runway in a conformal perspective view. This transition occurs as a craft becomes sufficiently close to the runway. The transition rate is determined by the craft's rate of descent, in some embodiments. In other embodiments, the transition rate is based on the craft's speed and distance from the targeted runway.

Additionally, in some embodiments, the targeted runway is highlighted. Highlighting includes outlining the runway with a colored box in some embodiments. In other embodiments, highlighting includes changing the color of the runway pavement. In one embodiment the highlighting color under normal circumstances is cyan. In other embodiments, other colors are used. In some embodiments, the border of the outline box changes thickness based on the distance of a craft from the runway. As the craft is further from the runway, the border is thicker. As the craft nears the runway, the border becomes thinner until the thickness matches the thickness of the runway border. In other embodiments, the display size and shape of the outline box varies based on the position of the craft in relation to the targeted runway, and based on the surrounding terrain displayed on the graphical display. In some embodiments, the outline box traces the terrain profile surrounding the runway. Additionally, in some embodiments, the brightness of the outline border varies depending on the position of the craft relative to the targeted runway. As the craft nears the runway, the brightness decreases. Similarly, in some embodiments, the brightness of runway pavement and runway guides, such as threshold markers and touch down point markers, varies depending on the position of the craft relative to the targeted runway. In some such embodiments, the brightness of different runway guides and the runway pavement color vary independently of each other. In some embodiments, the rate of change, or transition, of the brightness is based on a rate of change in altitude of the craft relative to the targeted runway. In other embodiments, the transition rate is based on a set time period. In yet other embodiments, the transition is based on the speed of the craft and the distance from the craft to the targeted runway.

In some embodiments, if it is determined that the runway status of the targeted runway is active, the color of runway guides changes color to warn the flight crew. In some embodiments, the warning color is yellow. In other embodiments, other warning colors are used. An active runway status indicates that something is already on or using the runway (i.e. there is activity on the runway). This includes, but is not limited to, another craft targeting the runway for take off or landing, another craft taxiing on the targeted runway, and ground crews and equipment located on the targeted runway. Active status of the runway is determined in some embodiments from data received from a control tower through wireless telecommunication techniques known to one of skill in the art. In other embodiments, active status is determined from sensor data received from sensors on-board the craft. In other embodiments, active status is determined from visual observation of the flight crew. Additionally, in some embodiments, alerts fade onto the display to warn flight crews that the targeted runway status is active. In some embodiments, a targeted runway is compared with a flight plan. At least one of runway guide colors, pavement colors, and surface textures change if the runway is not in the flight plan. Additionally, in other embodiments, it is determined if the craft has runway use clearance. If the craft does not have clearance to use the runway, at least one of runway guide colors, pavement colors, and surface textures change.

As described above, embodiments of the present invention identify runways; warn flight crews of dangers, such as an active runway status; and improve the visibility of selected runways through highlighting and brightness changes. Hence, embodiments of the present invention enable flight crews to navigate in low visibility conditions and maintain overall awareness when at an unfamiliar airport due to the runway alerts and guides. Additionally, the fading in and out of alerts and guides occurs gradually. In some embodiments, the transition is based on a set time period. In other embodiments, the transition is based on a rate of altitude change. In other embodiments, the transition rate is based on the speed of the craft and the distance to a targeted runway. This gradual transition reduces distraction to flight crews caused by sudden changes in a flight display. Additionally, the position of the alerts and guides is capable of being adjusted to preferences of a flight crew to further reduce distraction to a flight crew. Exemplary embodiments of runway alerts and guides, as described above, are shown and explained in more detail with regards to FIGS. 3-6.

Figure 2:
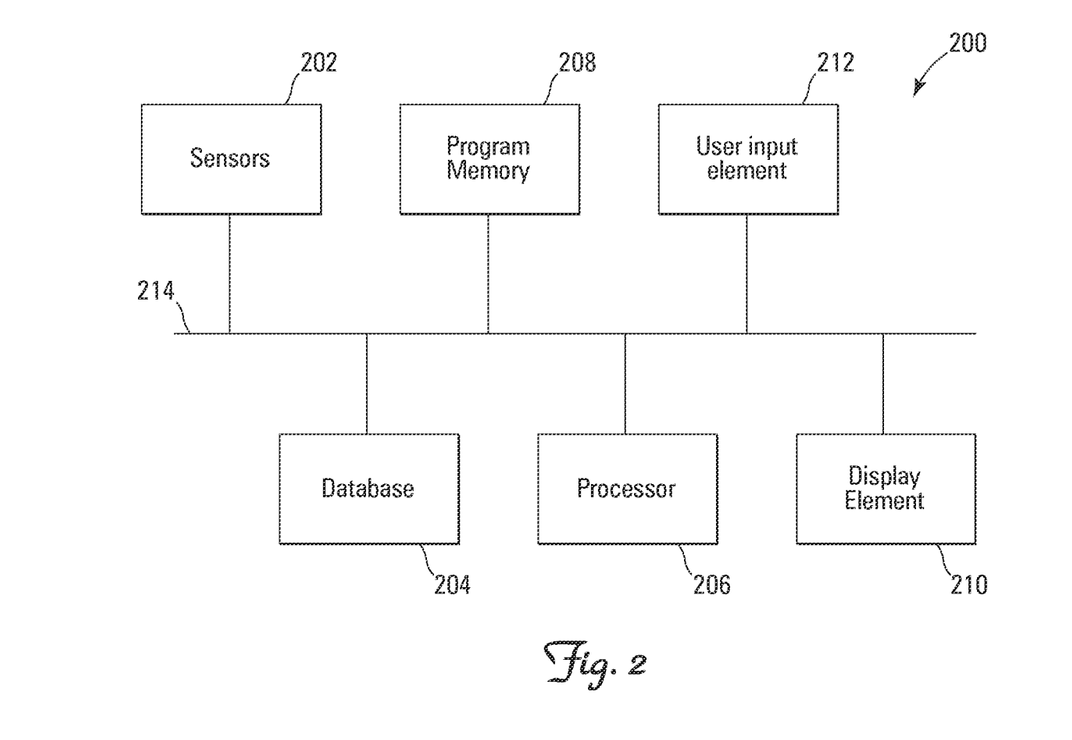
FIG. 2 is a block diagram of a graphical display system according to one embodiment of the present invention.

FIG. 2 is a block diagram of a graphical display system according to one embodiment of the present invention. In FIG. 2, an exemplary graphical display system 200 includes processor 206 configured to provide data to display element 210 for display. One or more data sources are coupled to processor 206 via bus 214. These data sources include, but are not limited to, sensors 202, user input element 212, database 204, and program memory 208. In some embodiments, one or more of these data sources are omitted. In some embodiments, processor 206 uses data obtained from sensors 202 in determining current aircraft position. In other embodiments, data from sensors 202 is used for display on display element 210 such as altitude, attitude, speed, etc. Sensors 202 include, but are not limited to, gyroscopes, accelerometers, magnetometers, global positioning system (GPS) receivers, infrared cameras, laser imagers, radars, etc.

User input element 212 includes, but is not limited to, keyboards, touch screens, microphones, etc. In some embodiments, user input element 212 comprises more than one type of input element. In other embodiments, display system 200 does not include user input element 212. User input element 212 is used, in some embodiments, to enable flight crews to select and obtain information regarding runways at an airport. In addition, user input element 212 is used, in some embodiments, to select the airport runway to be targeted.

Program memory 208 includes any type of suitable medium such as floppy disks, conventional hard disks, CD-ROM, flash memory ROM, nonvolatile ROM, RAM, or other suitable medium. Processor 206 and program memory 208 are coupled together allowing processor 206 to write to and store data in program memory 208 as well as retrieve stored data from program memory 208. In one embodiment, program memory 208 stores data from sensors 202 and user input element 212. In other embodiments, program memory 208 stores data to be transmitted from processor 206 to display element 210.

Database 204 is used to store a database of graphics for retrieval by processor 206 and display on display element 210. Database 204 includes, but is not limited to, a navigation database, terrain database, and airport database. In addition to graphics, database 204 is used to store other data regarding terrain, airports, and navigational aids used for display on display element 210. For example, airport databases include data regarding runway sizes, identification numbers, and positions. In some embodiments, database 204 is stored locally on-board the aircraft. In other embodiments, database 204 is stored remotely and transmits data to graphical display system 200 via wireless telecommunications technology known to one of skill in the art. Database 204 includes any type of suitable medium such as floppy disks, conventional hard disks, CD-ROM, flash memory ROM, nonvolatile ROM, RAM, or other suitable medium.

Processor 206 includes or interfaces with hardware components that support the graphics display system. By way of example and not by way of limitation, these hardware components include one or more microprocessors, graphics processors, memories, storage devices, interface cards, and other standard components known in the art. Additionally, processor 206 includes or functions with software programs, firmware or computer readable instructions for carrying out various methods, process tasks, calculations, control functions, and the generation of display signals and other data used in the operation of the display system. These instructions include methods for determining if a runway is to be targeted and for selecting alerts and guides based on a runway being targeted, and on craft position and trajectory relative to the targeted runway. These instructions are typically stored on any appropriate medium used for storage of computer readable instructions such as floppy disks, conventional hard disks, CD-ROM, flash ROM, nonvolatile ROM, RAM, and other like medium. In some embodiments, these instructions are stored on memory 208.

Processor 206 analyzes data received from sensors 202, user input element 212 and database 204. Based on this analysis, processor 206 sends signals to display element 210 instructing display element 210 to display airport runways, runway guides, and runway alerts, such as alerts indicating insufficient length of runway remaining. Display element 210 includes any display element suitable for displaying the various symbols and information for the operation of embodiments of the present invention. There are many known display elements that are suitable for this task, such as various CRT, active and passive matrix LCD, and plasma display systems. Processor 206 interfaces with and sends signals to display element 210 instructing display element 210 which graphics and data to display.

Figure 3:
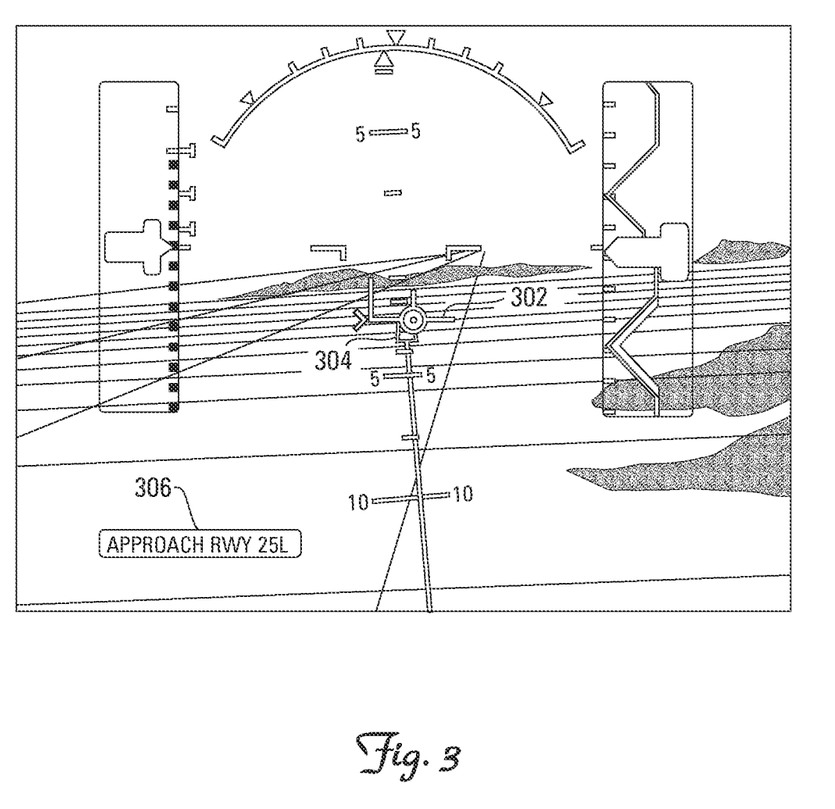
FIG. 3 is an image of a graphical display system according to one embodiment of the present invention.

FIG. 3 is an image of a graphical display system according to one embodiment of the present invention. In FIG. 3, an aircraft is targeting runway 304 by pointing flight path marker 302 at runway 304 for an extended period of time. Runway identifier 306 provides visual confirmation that the aircraft is targeting runway 304 and identifies the runway by its runway identification number, 25L. Runway identifier 306 is also displayed with positional information indicating the aircraft is approaching runway 304. Additionally, in some embodiments, runway 304 is outlined with a box providing visual confirmation of the runway being targeted. In some such embodiments, the border thickness of the outline box gradually decreases as the aircraft comes closer to the targeted runway and increases as the aircraft moves away from the targeted runway. In some embodiments, the rate of transition is based on the rate of altitude change of the aircraft relative to the targeted runway. In other embodiments, the rate of transition is based on the speed of the aircraft and the distance of the aircraft from the targeted runway. Additionally, in some embodiments the pavement color of runway 304 changes providing visual confirmation that the runway is being targeted. In some embodiments, the color of the outline and pavement changes color when the status of the targeted runway 304 is active as described above with regards to FIG. 1.

Figure 4:
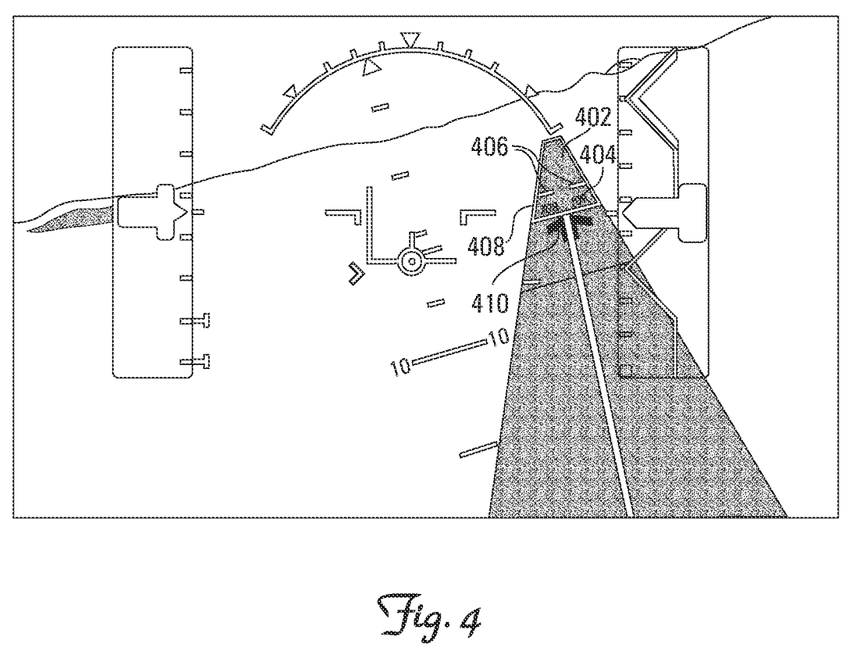
FIG. 4 is an image of a graphical display system according to one embodiment of the present invention.

FIG. 4 is an image of a graphical display system according to one embodiment of the present invention. In FIG. 4, an aircraft is approaching runway 402 for landing. As shown, runway 402 is outlined by outline box 408. Additionally, a touch down point is indicated by touch down point markers 406. In some embodiments, the pavement color of runway 402 is also changed to indicate the runway being targeted. Also shown in FIG. 4 are runway identifier 404 and threshold marker 410. Touch down point markers 406 and threshold marker 410 help guide a flight crew to the correct point on runway 402 where an aircraft should land (i.e. touch down). In FIG. 4, runway identifier 404 is displayed on runway 402 as if painted onto the pavement of runway 402 in a conformal perspective view. In some embodiments, the brightness level of outline box 408, threshold marker 410, and touch down point markers 406 varies based on the position of the aircraft relative to runway 402. In some such embodiments, the brightness level decreases as the aircraft altitude decreases relative to runway 402. In other embodiments, the brightness level decreases as the distance between the aircraft and runway 402 decreases. Additionally, in some embodiments the thickness of outline box 408 varies based on the position of the aircraft relative to runway 402 as described above with regards to FIGS. 1 and 3.

Figure 5:
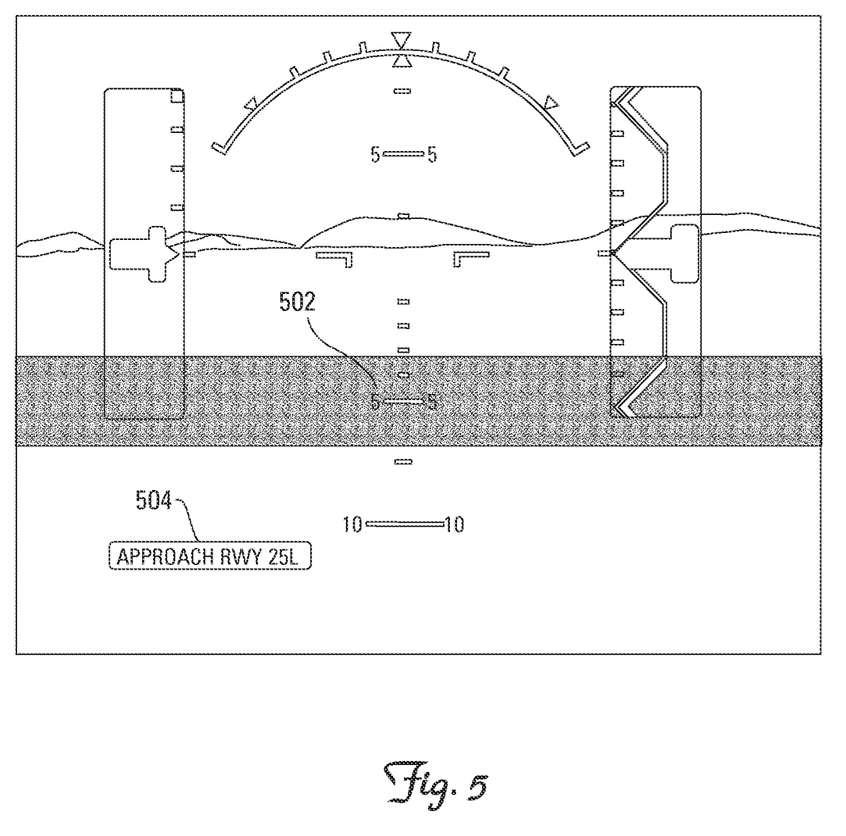
FIG. 5 is an image of a graphical display system according to one embodiment of the present invention.

FIG. 5 is an image of a graphical display system according to one embodiment of the present invention. In FIG. 5, an aircraft is taxiing or on the ground. The aircraft is targeting runway 502, in FIG. 5. It is determined that an aircraft is targeting runway 502, in FIG. 5, due to the close proximity of the aircraft to runway 502 and the trajectory of the aircraft crosses runway 502. Runway identifier 504 gradually fades in to identify runway 502 by its runway identification number, 25L, and is displayed with positional information to indicate that the aircraft is approaching runway 502. As the aircraft crosses over runway 502, positional information displayed with runway identifier 504 changes gradually to indicate that the aircraft is on runway 502. For example, in one embodiment, runway identifier 540 displays 'on rwy 25L' in FIG. 5 to indicate when the aircraft is on runway 502. As the aircraft exits runway 502, runway identifier 504 changes to indicate that the aircraft is departing runway 502. In some embodiments, runway identifier 504 changes once the aircraft has completely exited runway 502. In other embodiments, runway identifier 504 changes once the aircraft has partially exited runway 502.

Figure 6:
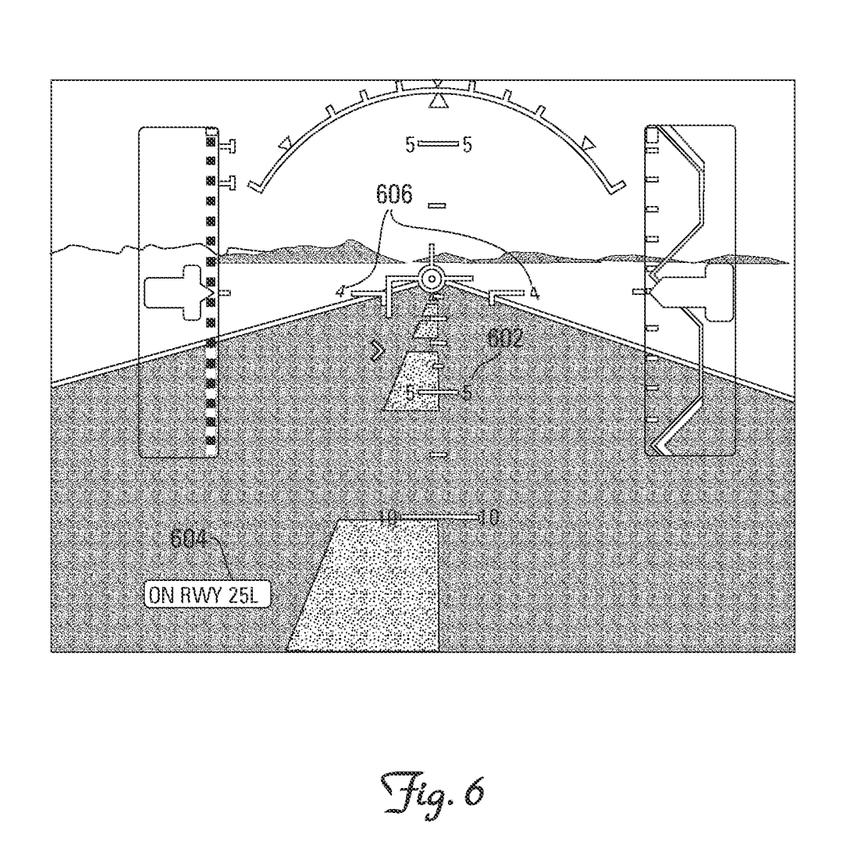
FIG. 6 is an image of a graphical display system according to one embodiment of the present invention.

FIG. 6 is an image of a graphical display system according to one embodiment of the present invention. In FIG. 6, an aircraft is targeting runway 602 because the aircraft is in close proximity to runway 602 and the trajectory of the aircraft is substantially aligned with the bearing of runway 602. Runway identifier 604 indicates that the aircraft is on runway 602 and indicates the runway identification number of runway 602. In some embodiments, runway identifier with just the runway identification number of runway 602 is painted onto runway 602 in a perspective conformal view.

Distance remaining markers 606 indicate the distance remaining on runway 602 measured from a far end of runway 602 in front of the aircraft. As shown, in some embodiments, distance remaining markers 606 are displayed in a perspective conformal view. In a perspective conformal view, distance remaining markers 606 help give a flight crew a sense of motion and speed. In some embodiments, distance remaining markers 606 are displayed in a perspective view at fixed positions along runway 602. In such embodiments, distance remaining markers 606 will grow larger or smaller as the craft draws closer or further away from the fixed position along runway 602. In other embodiments, distance remaining markers 606 are displayed in a perspective view at positions relative to the current craft position. In such embodiments, the display positions of distance remaining markers 606 change according to movement of the craft in order to maintain the positions relative to the current craft position rather than relative to a fixed position along runway 602. In yet other embodiments, the distance remaining on a runway is displayed in a numerical readout. In some embodiments, such as during landing or take off, the color of distance remaining markers 606 changes or flashes to warn a flight crew if insufficient distance remains for the aircraft to safely complete its task. Additionally, in some embodiments, alerts fade into the display in FIG. 6 to indicate insufficient distance remaining.

Although specific embodiments have been illustrated and described herein, it will be appreciated by those of ordinary skill in the art that any arrangement, which is calculated to achieve the same purpose, may be substituted for the specific embodiment shown. For example, although the specific embodiments illustrated are directed at aircraft, the method and apparatus may be used in various embodiments employing various types of crafts, such as space craft, helicopters, and UAVs, etc. This application is intended to cover any adaptations or variations of the present invention. Therefore, it is manifestly intended that this invention be limited only by the claims and the equivalents thereof.

What is claimed is:

1. A graphical display system, comprising:
   one or more sensors for obtaining data, wherein the data obtained includes position and trajectory data for a craft and airport data;
   a display element for displaying graphics and data; and
   at least one processor coupled to the one or more sensors, wherein, based on data received from the one or more sensors regarding craft position and trajectory relative to an airport, the at least one processor determines if a runway is being targeted, selects which runway guides and alerts to display based on data obtained and runway targeted, and sends signals to the display element to display the targeted runway with the selected runway guides and alerts,
   wherein displaying runway alerts and guides includes at least one of:
   fading in runway alerts and guides for a targeted runway; or
   displaying perspective runway distance remaining markers at fixed display positions along the displayed runway.

2. The graphical display system of claim 1, wherein the at least one processor determines if a runway is being targeted by detecting a flight path marker pointing at a runway for an extended period of time.

3. The graphical display system of claim 1, wherein the display element fades runway guides and alerts onto the display according to signals received from the at least one processor.

4. The graphical display system of claim 1, wherein the processor sends signals to the display element to adjust the brightness levels of runway guides and alerts based on the position of the craft relative to the targeted runway.

5. The graphical display system of claim 1, wherein the at least one processor sends a signal to the display element to highlight runway guides.

6. The graphical display system of claim 5, wherein a signal to the display element to highlight runway guides includes a signal to outline the targeted runway with an outline box.

7. The graphical display system of claim 6, wherein the thickness of borders of an outline box around the targeted runway varies based on the position of the craft relative to the targeted runway.

8. The graphical display system of claim 1, wherein displaying runway alerts and guides includes:
   displaying perspective runway distance remaining markers at positions relative to current craft position, wherein the display positions of the distance remaining markers change according to movement of the craft in order to maintain the positions relative to the current craft position.

9. The graphical display system of claim 8, wherein the runway alerts and guides includes fading in runway identification numbers on a surface of the targeted runway in a perspective conformal view format.

10. The graphical display system of claim 8, wherein the runway alerts and guides includes changing the color of guides gradually to indicate dangerous conditions on a targeted runway.

11. The graphical display system of claim 8 wherein the runway alerts and guides includes:
    comparing the targeted runway with a flight plan and, when the targeted runway is not in the flight plan, changing at least one of: runway guides colors, pavement colors, and surface textures; and
    determining if the targeted runway has runway use clearance and, when the targeted runway does not have runway use clearance, changing at least one of: runway guides colors, pavement colors, and surface textures.

12. A non-transitory computer readable medium having computer-executable instructions for performing a method of providing a visual runway awareness and advisory display, the method comprising:
    receiving craft position and trajectory data;
    receiving runway status data; determining when a runway is being targeted;
    selecting runway guides and alerts to display with a targeted runway based on runway status of the targeted runway, craft position and craft trajectory; and
    displaying runway guides and alerts on a graphical display with the targeted runway, wherein determining when a runway is being targeted includes obtaining data from a flight plan indicating a runway is to be targeted.

13. The non-transitory computer readable medium of claim 12, wherein displaying runway guides and alerts includes changing the color gradually of runway guides and alerts to indicate dangerous runway status.

14. The non-transitory computer readable medium of claim 12, wherein displaying runway guides and alerts includes adjusting the brightness levels of runway guides and alerts based on the position and trajectory of the craft relative to a targeted runway.

15. The non-transitory computer readable medium of claim 12, wherein displaying runway guides and alerts includes fading in runway guides and alerts gradually.

16. The non-transitory computer readable medium of claim 15, wherein fading in runway guides and alerts gradually includes fading in runway guides at a rate based on a rate of change in craft position relative to a targeted runway.

17. The non-transitory computer readable medium of claim 12, wherein displaying runway guides and alerts includes highlighting a targeted runway.

18. The non-transitory computer readable medium of claim 17, wherein highlighting a targeted runway includes gradually changing the color of the targeted runway pavement.

* * * * *